(12) United States Patent
Ker et al.

(10) Patent No.: US 7,145,382 B2
(45) Date of Patent: Dec. 5, 2006

(54) CHARGE PUMP CIRCUIT SUITABLE FOR LOW-VOLTAGE PROCESS

(75) Inventors: Ming-Dou Ker, Hsinchu (TW); Chia-Sheng Tsai, Taichung (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 10/861,359

(22) Filed: Jun. 7, 2004

(65) Prior Publication Data

US 2005/0146375 A1  Jul. 7, 2005

(30) Foreign Application Priority Data

Jan. 2, 2004 (TW) .............................. 93100084 A

(51) Int. Cl.
*G05F 3/24* (2006.01)
(52) U.S. Cl. ........................................ 327/536; 326/537
(58) Field of Classification Search ................ 327/530, 327/536–537, 589; 363/59, 60
See application file for complete search history.

(56) References Cited

U.S. PATENT DOCUMENTS

| | | | | |
|---|---|---|---|---|
| 5,625,544 A | * | 4/1997 | Kowshik et al. | 363/59 |
| 6,100,752 A | * | 8/2000 | Lee et al. | 327/536 |
| 6,278,315 B1 | * | 8/2001 | Kim | 327/536 |
| 6,459,328 B1 | * | 10/2002 | Sato | 327/536 |
| 6,476,666 B1 | * | 11/2002 | Palusa et al. | 327/536 |
| 6,664,846 B1 | * | 12/2003 | Maung et al. | 327/536 |
| 6,690,227 B1 | * | 2/2004 | Lee et al. | 327/536 |
| 6,812,773 B1 | * | 11/2004 | Chou | 327/536 |
| 6,914,791 B1 | * | 7/2005 | Park et al. | 363/60 |

* cited by examiner

*Primary Examiner*—Dinh T. Le
(74) *Attorney, Agent, or Firm*—Rosenberg, Klein & Lee

(57) ABSTRACT

The present invention discloses a charge pump circuit suitable for a low-voltage process. The charge pump circuit is composed of stages of the voltage amplifying circuits connected each other, and the operation of two adjacent stages of voltage amplifying circuit is controlled by two opposite set of the timing signals. Each stage of the voltage amplifying circuit has a coupled pair of a first complementary MOS (CMOS) transistor and a second CMOS transistor switching in accordance with a timing signal and an inverse timing signal inputted into the first and second capacitors. Then, two diode devices guide charges to next stage, and a voltage higher than the integrated circuit voltage source is outputted. The present invention has advantage of high pumping gain, and the reliability issue of the gate oxide layer in the low-voltage process can be also solved.

7 Claims, 9 Drawing Sheets

CHARGE PUMP CIRCUIT SUITABLE FOR LOW-VOLTAGE PROCESS

BACKGROUND OF INVENTION

1. Field of the Invention

The invention relates to a charge pump circuit, and more particularly, to a charge pump circuit suitable for a low-voltage process and having a high pumping gain.

2. Description of the Prior Art

When using the general volatile memory devices, such as dynamic random access memory (DRAM) or static random access memory (SRAM), the stored data will be removed after turning the power off. If we want to keep the data after turning the power off, we should use the non-volatile memory devices, such as read-only memory (ROM), programmable read-only memory (PROM), erasable programmable read-only memory (EPROM), electrically erasable programmable read-only memory (EEPROM) and flash memory (Flash).

The EEPROM or Flash needs a charge pump circuit to provide a voltage higher than the integrated circuit voltage source to perform the program or erase procedure. The charge pump circuit can provide not only the high voltage required for operation of the memory devices but also can provide the high voltage for other purposes.

FIG. 1 shows a common charge pump circuit (called Dickson C.P.), which is a 4-stage charge pump. The charge pump circuit provides memory devices with high voltage by controlling a series of connected NMOS transistors and capacitors to boost the voltage source ($V_{DD}$) stage by stage. But the threshold voltage ($V_t$) of a diode-connected MOSFET is increased due to the body effect while voltage of each pumping node is boosted, that may cause lowering of efficiency of the charge pump. The aggravation of the charge pump has a negative influence on the low-voltage source, and may cause the invalidity of the charge pump circuit for memory devices using low-voltage source.

For improving the pumping gain, another charge pump circuit (called J.-T C.P.) is developed. The charge pump circuit provides a method to transfer charges while the forward bias of the diode-connected MOSFET is lower than the threshold voltage. As shown in FIG. 2(a), a charge transfer circuit (CTS) is added into the charge pump circuit, and the MOSFET switch is timely opened or closed to be a charge transfer circuit to transfer charges. The pumping gain of the charge pump is improved to $V_G = \Delta V = V_{DD}$ by means of the charge transfer circuits, and if the parasitic capacitance of each pumping node is ignored, the maximum voltage difference between each pumping stage will be $V_{d(max)} = V_{DD} + V_G = 2V_{DD}$. Please also refer to FIG. 2(b). The voltage difference between node 1 and node 2 is marked as V12, which has a maximum value $2V_{DD}$ between time periods T1 and T3, and this situation also happens on simultaneous V34 and V23 between time periods T2 and T4. If the voltage source is a typical voltage source used in manufacturing process, such as 1.8V used in the 0.18 μm process of the 40 Å thickness gate oxide layer, most MOSFETS in the circuit will exceed the bearable voltage of the gate oxide layer (2*1.8=3.6V) that leads to the avalanche of the gate oxide layer and the failure of the device.

The conventional charge pump circuit has an exceeding high voltage on the gate oxide layer in the low-voltage manufacture process and the pumping gain of the conventional charge pump circuit is not high enough, so the present invention provides a charge pump circuit suitable for a low-voltage process and having a high pumping gain to overcome the disadvantages.

SUMMARY OF INVENTION

It is therefore a primary objective of the claimed invention to provide a charge pump circuit suitable for a low-voltage process that has advantage of high pumping gain. The device is punily affected by the body effect, so the reliability issue of the gate oxide layer in the low-voltage process can be solved.

It is therefore another objective of the claimed invention to provide a charge pump circuit suitable for a low-voltage process that doesn't have problem of high voltage on the gate oxide layer, and this circuit is suitable for producing the high voltage applied to the low-voltage devices to overcome the overload problem on the gate oxide layer.

According to the claimed invention, a charge pump circuit is composed of stages of the voltage amplifying circuits connected each to the other, wherein the operation of two adjacent stages of voltage amplifying circuit is controlled by two opposite set of the timing signals. Each stage of the voltage amplifying circuit has a coupled pair of a first complementary MOS (CMOS) transistor and a second CMOS transistor, wherein the first CMOS transistor is connected to a corresponding first capacitor to perform switching operation in accordance with a timing signal inputted into the first capacitors, and wherein the second CMOS transistor is connected to a corresponding second capacitor to perform switching operation in accordance with an inverse timing signal inputted into the second capacitor. Then, two diode devices are individually connected to gate electrodes of the first and second CMOS transistors for guiding charges to an output of the stage to supply the charges to a next stage or to the voltage-outputting terminal of the entire charge pump circuit. Finally, a voltage higher than a voltage of the integrated circuit voltage source is outputted at the voltage-outputting terminal of the charge pump circuit to be supplied to the memory device.

These and other objectives of the present invention will become apparent to those of ordinary skill in the art after reading the following detailed description of the preferred embodiment that is illustrated in the various figures and drawings.

Figure 1:
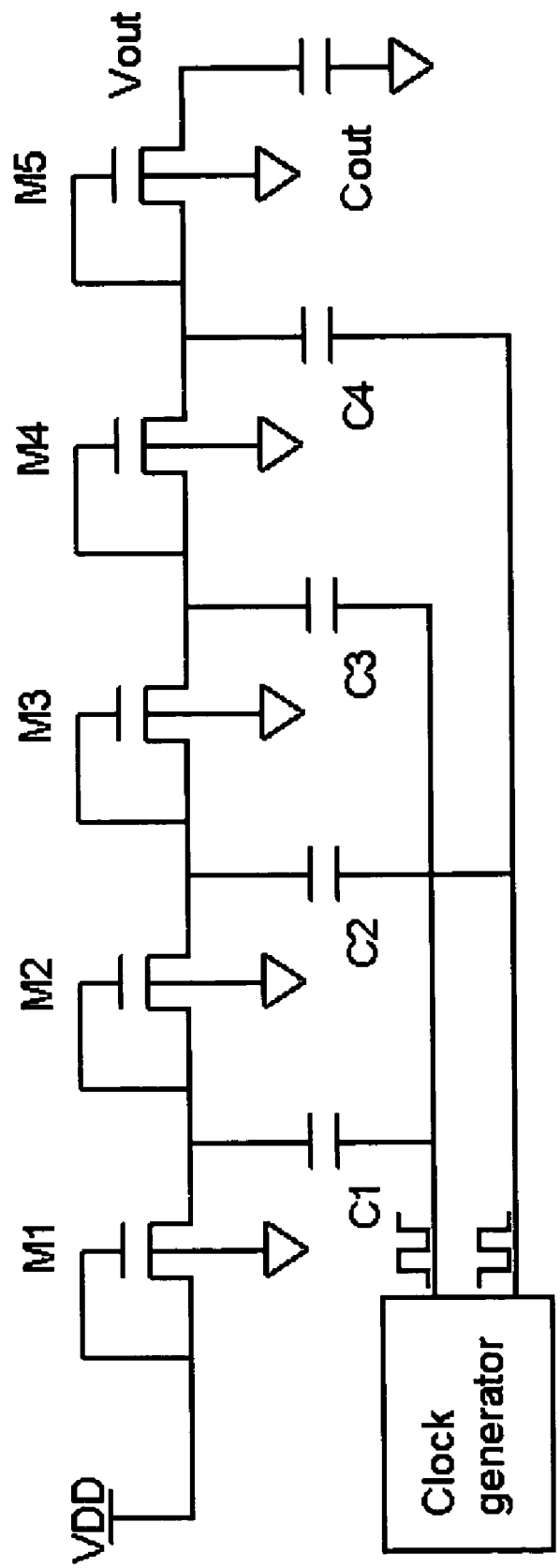
FIG. 1 is a schematic diagram of a charge pump circuit according to the prior art.
Figure 2A:
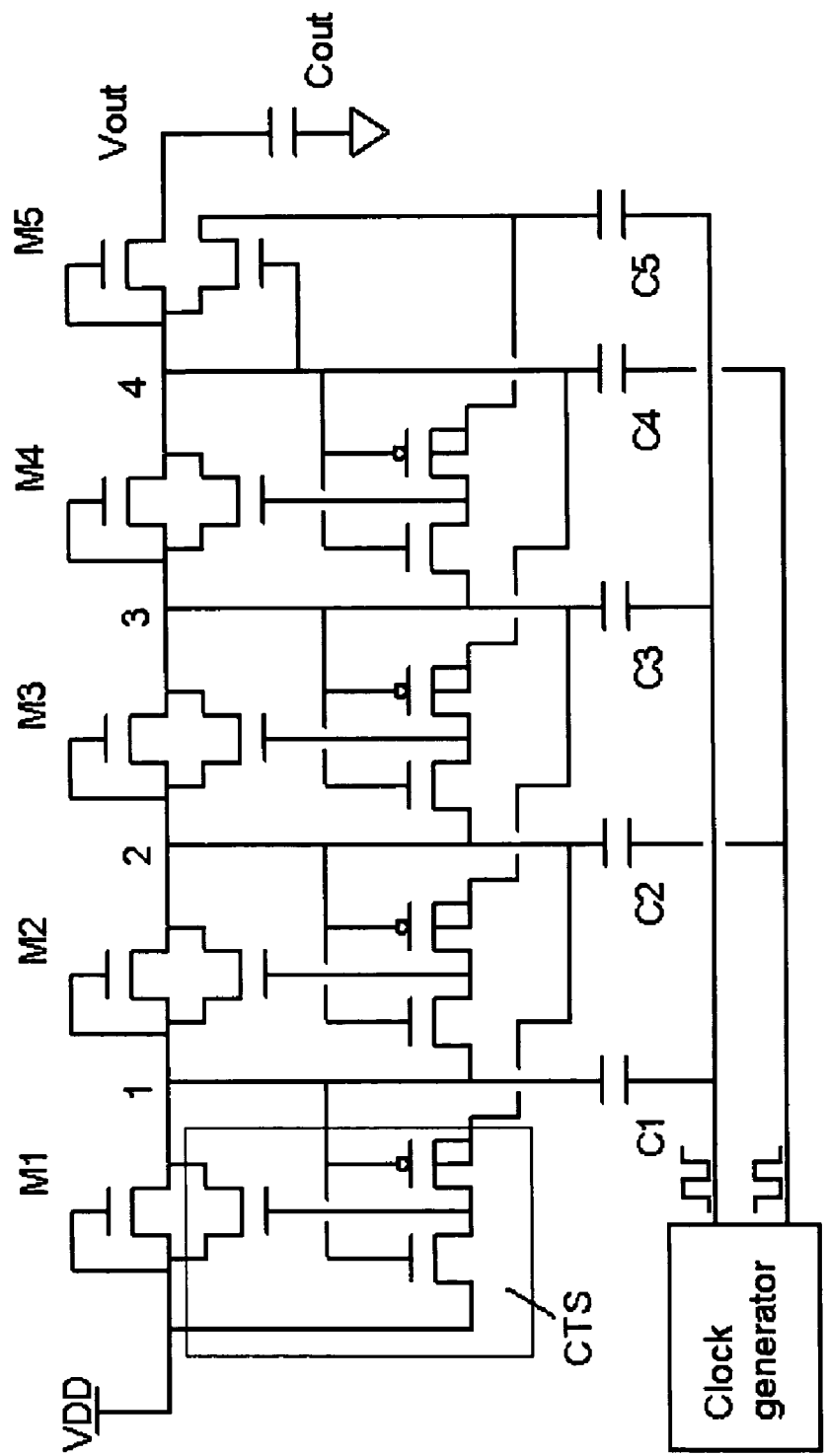
FIGS. 2(a) and 2(b) are a schematic diagram and a voltage signal diagram of another charge pump circuit according to the prior art.
Figure 2B:
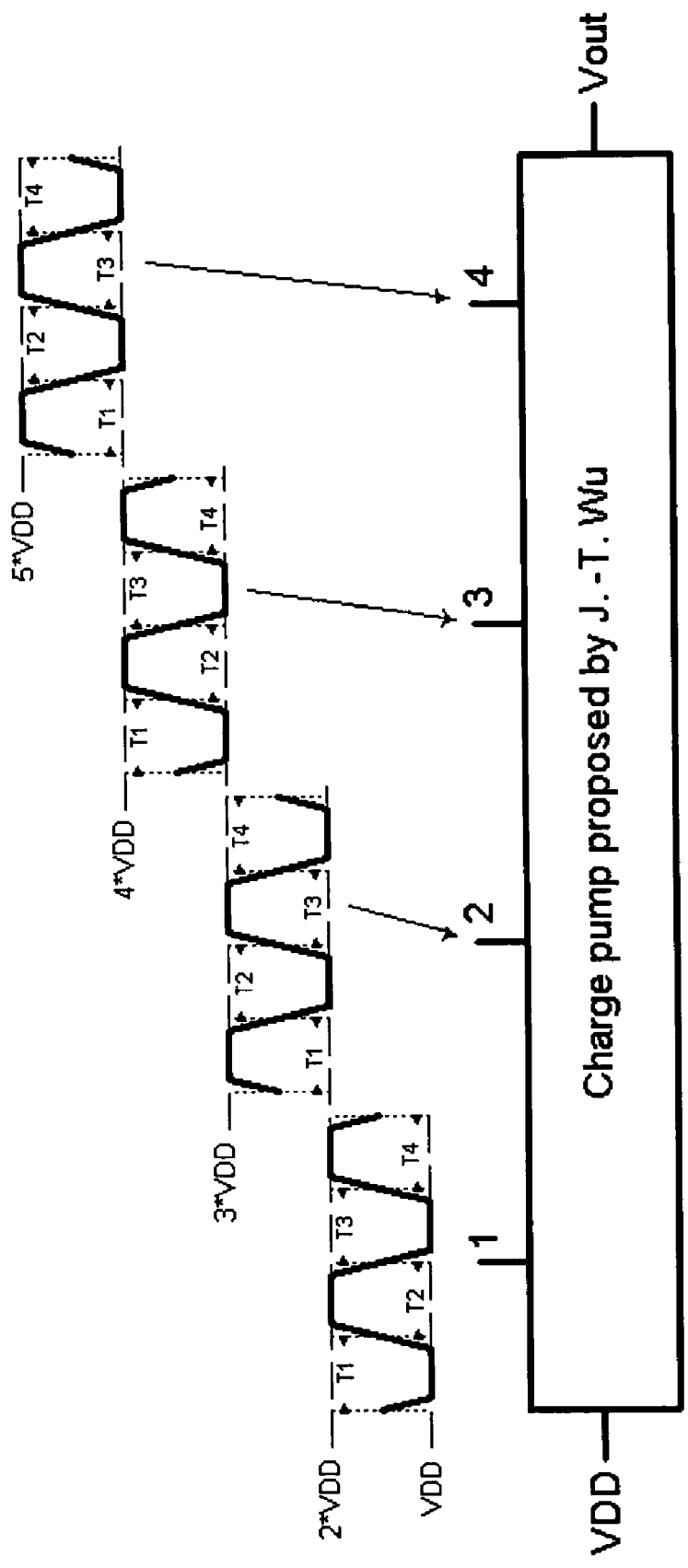

10 the first CMOS transistor
12 the first capacitor
14 NMOS transistor

16 PMOS transistor
18 diode device
20 the second CMOS transistor
22 the second capacitor
24 NMOS transistor
26 PMOS transistor
28 diode device

DETAILED DESCRIPTION

The charge pump circuit is popularly used in the integrated circuits, such as in the memory IC, the analog or digital IC and the LCD drive IC. With the progression of process, the voltage tolerance of devices is getting smaller, and the present invention discloses a charge pump circuit suitable for a low-voltage process that has high pumping gain and no exceeding voltage on the gate oxide layer.

The claimed charge pump circuit is composed of a plurality of stages (1-stage to n-stage) of voltage amplifying circuits connected each other, and the operation of two adjacent stages of voltage amplifying circuits is controlled by two opposite timing signals. The embodiment in FIG. 3(a) uses a 4-stage voltage amplifying circuit to explain the present invention.

Figure 3A:
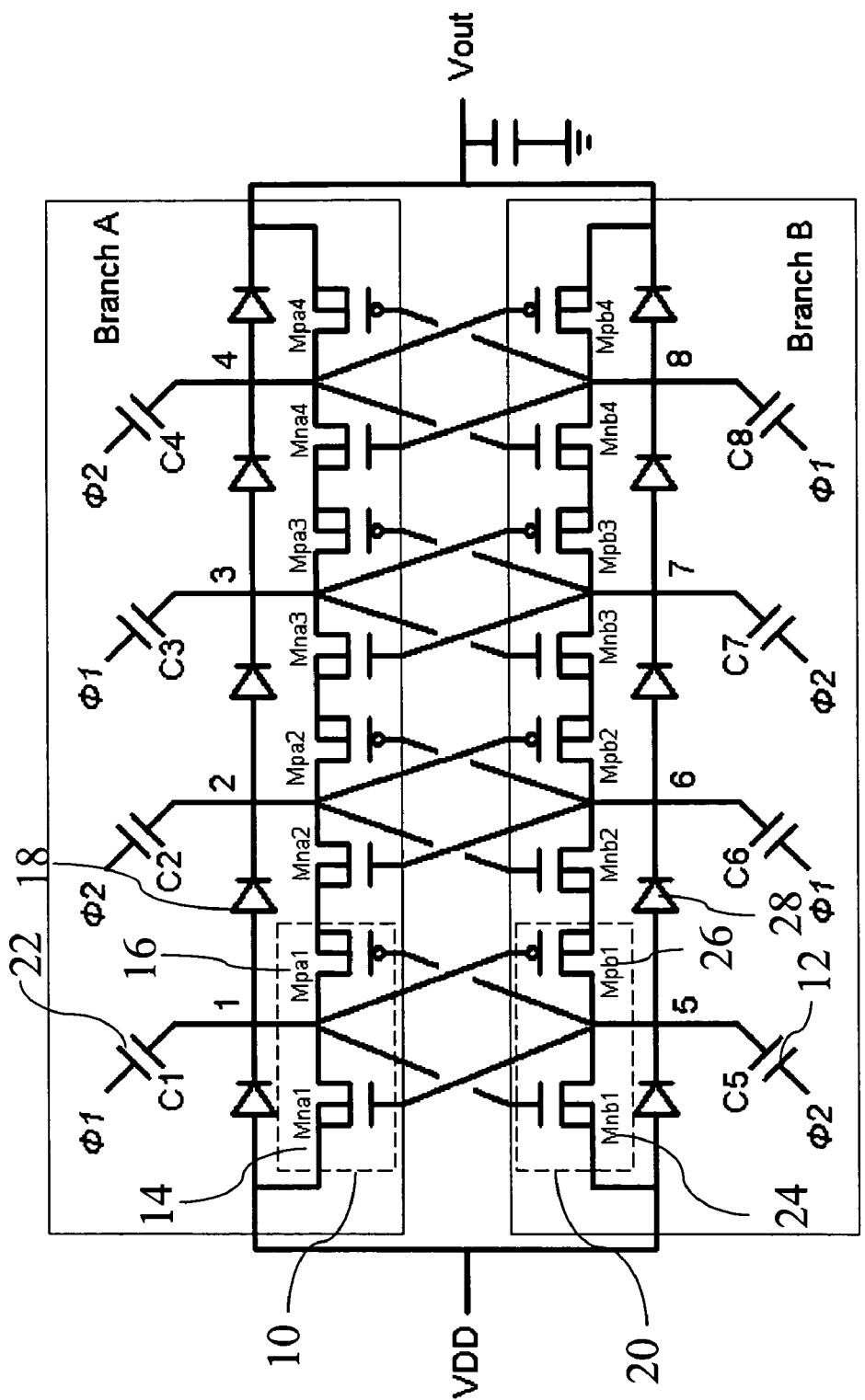
FIGS. 3(a) and 3(b) are a schematic diagram and a voltage signal diagram of a charge pump circuit according to the present invention.

As shown in FIG. 3(a), each stage of the voltage amplifying circuit comprises a coupled pair of a first complementary MOS (CMOS) transistor 10 and a second CMOS transistor 20. The first CMOS transistor 10 is connected to a corresponding first capacitor (C5) 12 to perform switching operation in accordance with a timing signal ($\phi 2$) inputted into the first capacitor 12, and the first CMOS transistor 10 is composed of a NMOS transistor (Mna1~Mna4) 14 and a PMOS transistor (Mpa1~Mpa4) 16. The source electrode of the NMOS transistor 14 is connected to a voltage inputting terminal, and the source electrode of the PMOS transistor 16 is connected to the voltage inputting terminal of next stage. The drain electrodes of the NMOS transistor 14 and the PMOS transistor 16 are coupled to the first capacitor 12. In addition, the second CMOS transistor 20 is connected to a corresponding second capacitor (C1) 22 to perform switching operation in accordance with an inverse timing signal ($\phi 1$) inputted into the second capacitor 22, and the second CMOS transistor 20 is also composed of a NMOS transistor (Mnb1~Mnb4) 24 and a PMOS transistor (Mpb1~Mpb4) 26. The source electrode of the NMOS transistor 24 is connected to a voltage inputting terminal, and the source electrode of the PMOS transistor 26 is connected to the voltage inputting terminal of next stage. The drain electrodes of the NMOS transistor 24 and the PMOS transistor 26 are also coupled to the second capacitor 22.

Each stage of the voltage amplifying circuit further comprises two diode devices 18, 28 individually connected to gate electrodes of the first and second CMOS transistors 10, 20. The diode devices 18, 28 are used for limiting charges accumulating on gate electrode of the CMOS transistors 10, 20 to flow in one direction and guiding charges to next stage through the diode devices 18, 28. In addition, when the voltage difference between the diode devices 18, 28 is only 0.7V, the diode devices 18, 28 will be closed without guiding charges. At this moment, the CMOS transistors 10, 20 keep guiding charges to the next stage till voltages at both ends are equal. A voltage higher than the integrated circuit voltage source can be obtained at the voltage outputting terminal by continuously outputting and accumulating charges.

After referring FIG. 3(a), the timing signals $\phi 1$ and $\phi 2$ are opposite signals, and have the same amplitude with the voltage source (VDD). The charge pump circuit has two equivalent parts marked with Branch A and Branch B, and the both architectures are similar besides the timing signals. If the timing signal of the first and third stages of the voltage amplifying circuit in Branch A is $\phi 1$, the timing signal in Branch B will be $\phi 2$. Oppositely, if the timing signal of the first and third stages of the voltage amplifying circuit in Branch A is $\phi 2$, the timing signal in Branch B will be $\phi 1$. These two opposite timing signals $\phi 1$ and $\phi 2$ are produced by a timing signal generator.

Figure 3B:
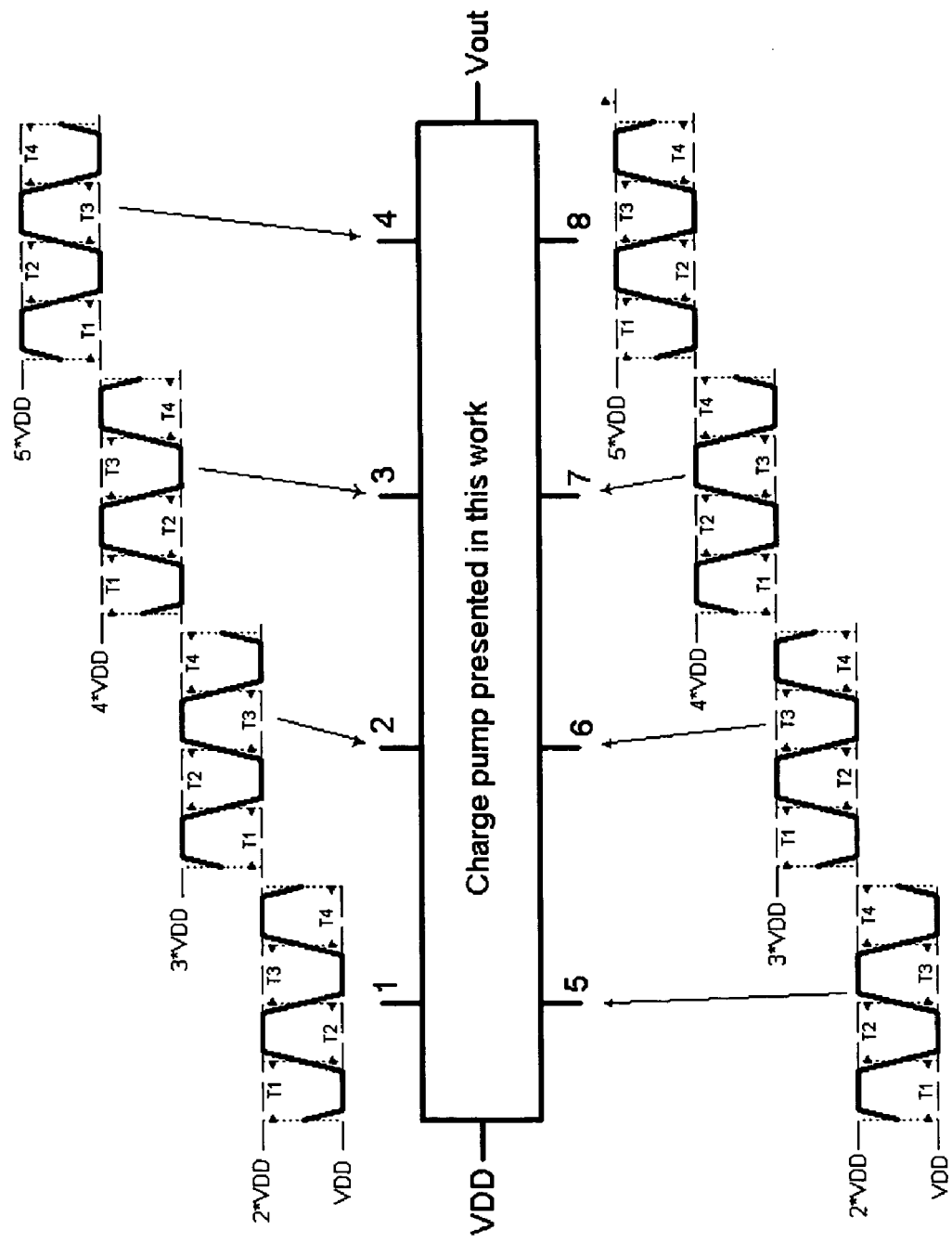

Moreover, each stage of the claimed voltage amplifying circuit can be normally opened and closed, and each branch can be an independent charge pump circuit. Since the timing signals of Branch A and Branch B are inverse, the waveform at nodes 1–4 and nodes 5–8 are also inverse. The waveform at nodes 1–8 are shown in FIG. 3(b).

The operation status of each voltage amplifying circuit (also called the charge transfer circuit, CTS) is confirmed below. Firstly, to the first stage of the voltage amplifying circuit, as shown in FIG. 3(b), the timing signal $\phi 1$ in time period T1 is low and $\phi 2$ is high. The rated voltage of V15 is −VDD, so the switch Mna1 of the MOSFET is opened to drive charges flowing from the voltage source terminal to node 1 and the switch Mnb1 is closed to stop charges flowing from node 5 to the voltage source terminal. On the other hand, in time period T2, the ideal operating voltage of V15 is VDD. For stopping charges flowing from node 1 to the voltage source terminal, Mna1 is closed and Mnb1 is opened to drive charges flowing from the voltage source terminal to node 5. To other stages, illustrated with the second stage of the voltage amplifying circuit, the timing signal $\phi 1$ in time period T1 is low and $\phi 2$ is high. The rated voltages of V15 and V26 are −VDD and VDD, so the switches Mpa1 and Mna2 of the MOSFET is opened to drive charges flowing from node 1 to node 2 and the switches Mpb1 and Mnb2 are closed to stop charges flowing from node 6 to node 5. On the other hand, in time period T2, the ideal operating voltages of V15 and V26 are VDD and −VDD. For stopping charges flowing from node 2 to node 1, Mpa1 and Mna2 are closed and Mpb1 and Mnb2 are opened to drive charges flowing from node 5 to node 6. To the outputting stage, the timing signal $\phi 1$ in time period T1 is low and $\phi 2$ is high. The rated voltage of V48 is VDD, so the switch Mpa4 of the MOSFET is opened to drive charges flowing from node 4 to the outputting node and the switch Mpb4 is closed to stop charges flowing from the outputting node to node 8. On the other hand, in time period T2, the ideal operating voltages of V48 is −VDD. For stopping charges flowing from the outputting node to node 4, Mpa4 is closed and Mpb4 is opened to drive charges flowing from node 8 to the outputting node. Hence, according to the above description, Branch A and Branch B will output a high voltage alternately.

Figure 4A:
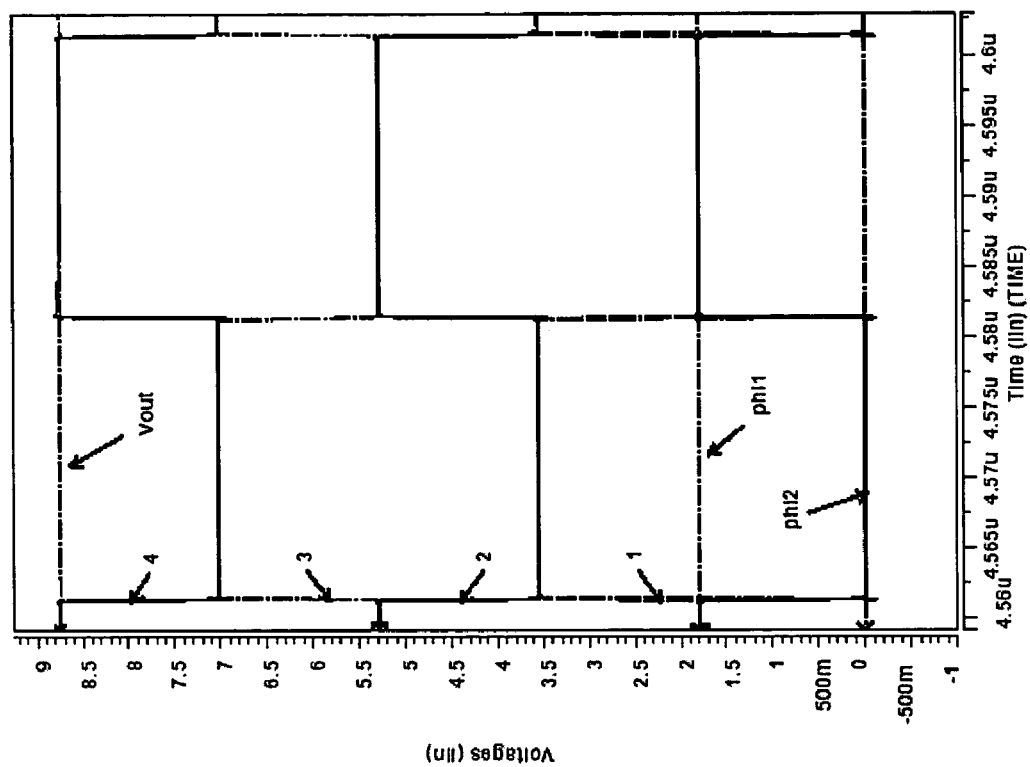
FIGS. 4(a) and 4(b) are diagrams of voltage wave at every nodes of the charge pump circuit according to the present invention.
Figure 4B:
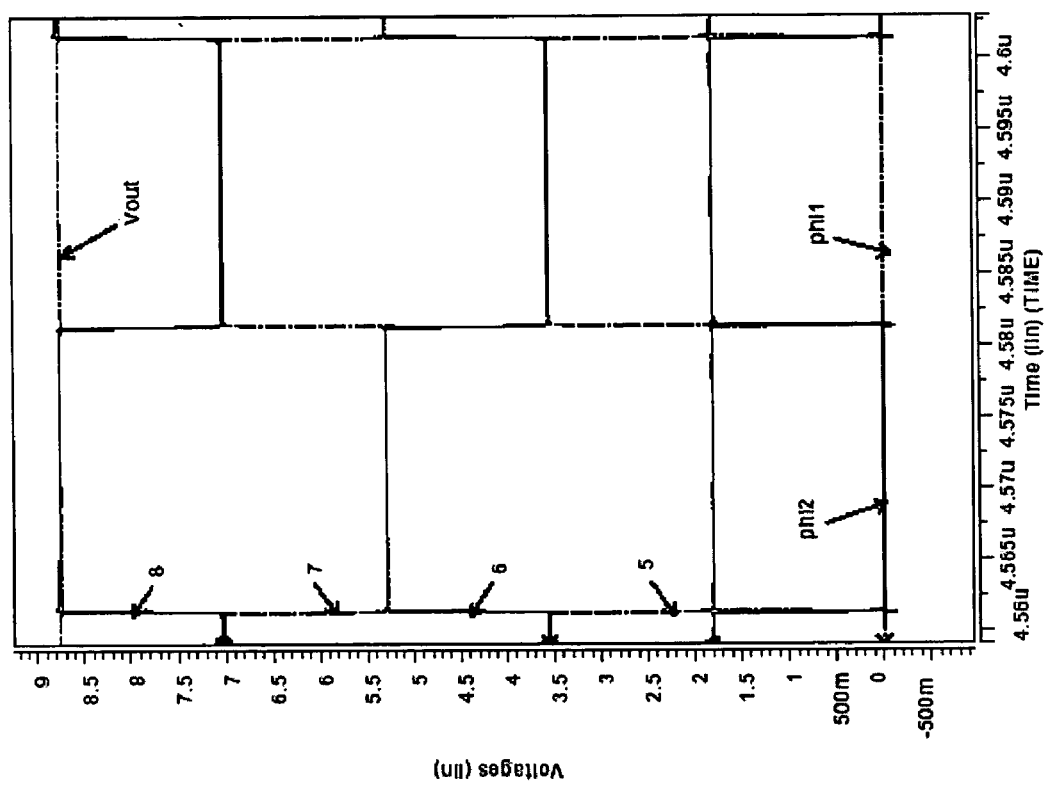

The circuit is simulated with a SPICE model of a TSMC 0.18 μm transistor and the result is shown in FIGS. 4(a) and 4(b). FIGS. 4(a) and 4(b) are diagrams of voltage wave at nodes 1–8 of the charge pump circuit with 1.8V voltage supply and 5 μA outputting load current, and the result is similar to that anticipated. The trivial difference between the output voltage Vout 8.39V and the ideal value 5*VDD=9V is produced by the parasitic capacitor and outputting load current.

The present invention and two prior arts are compared now. Firstly, to the reliability, the diode-connected MOSFET is used for driving charges to the next stage in the Dickson C.P charge pump circuit. When the diode-connected MOSFET is OFF to avoid charges flowing back, the voltage across the gate oxide layer of the diode-connected MOSFET is 2*VDD−Vt. If VDD is the rated supplying voltage, the diode-connected MOSFET will be damaged in a short time. In the J.-T charge pump circuit, not only the diode-connected MOSFET but also the charge transfer circuit and its controlling circuit are operated in exceeding voltages at both ends of the gate oxide layer. The only method to safely operate in the low-voltage process is lowering the supplying voltage to about 0.5*VDD, and that is not enough for the memory device. In the present invention, the charge pump circuit will overcome these problems and the reliability issue is also considered without lowering the supplying voltage.

Figure 5:
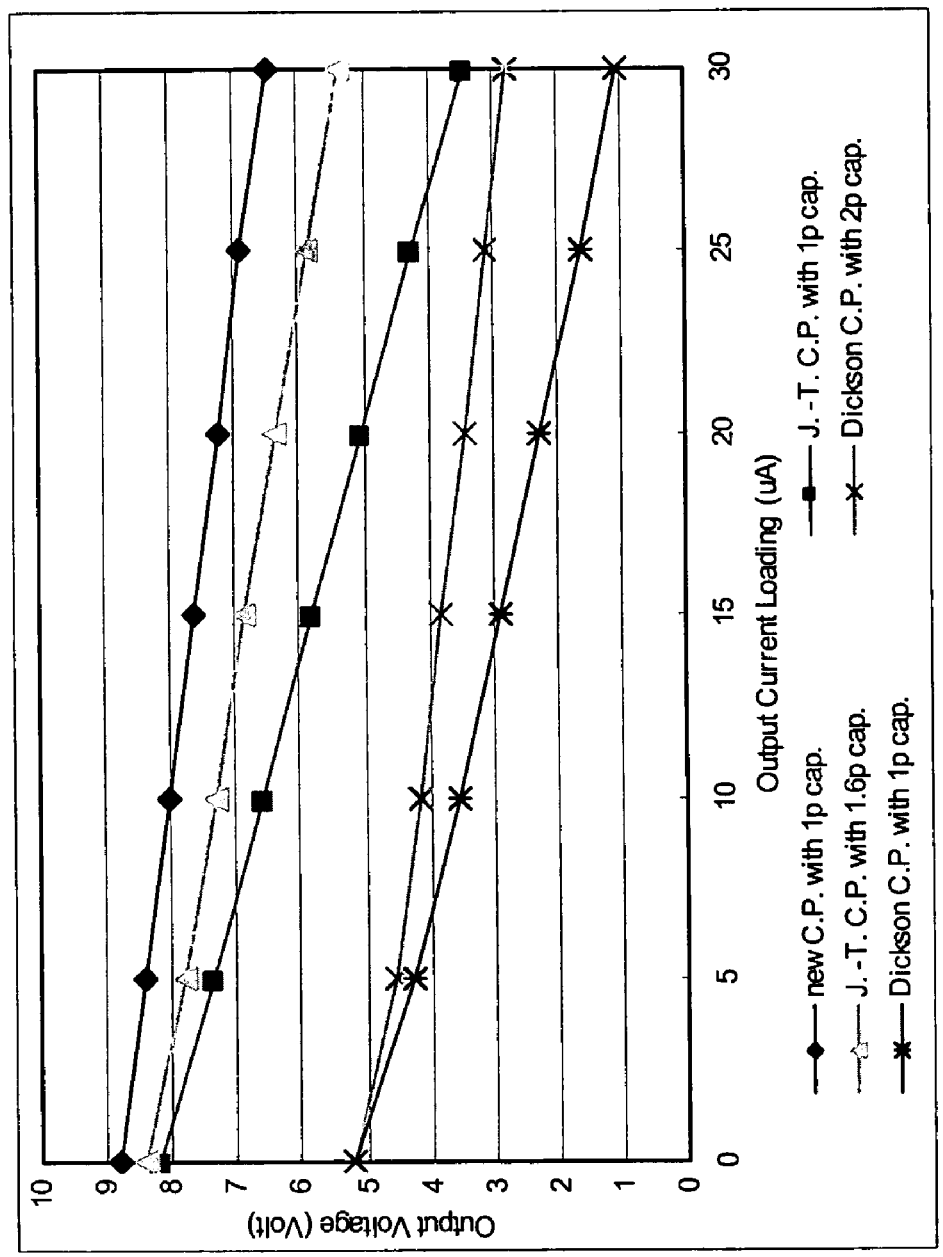
FIG. 5 is a comparison curve of the output voltage under different output currents of the present invention and the prior art.

FIG. 5 is a comparison curve of the output voltage under different output currents of the present invention and the prior art. All the compared circuits have 2 p voltage-regulating capacitors. Obviously, in the situation of using same 1 p driving capacitor, the charge pump circuit of the present invention is better than that of the prior arts, especially in the situation of high current load. Since the charge pump circuit of the present invention has two branches to alternatively drive charges to the outputting nodes, and the voltage variance at each pumping node is $$\Delta V = V_{CLK} \times \frac{C_{pump}}{C_{pump} + C_{par}} - \frac{I_O}{2f(C_{pump} + C_{par})} \approx V_{CLK} - \frac{I_O}{2fC_{pump}}$$

so the curve slope of the claimed charge pump circuit is about half of that of the prior arts.

Figure 6:
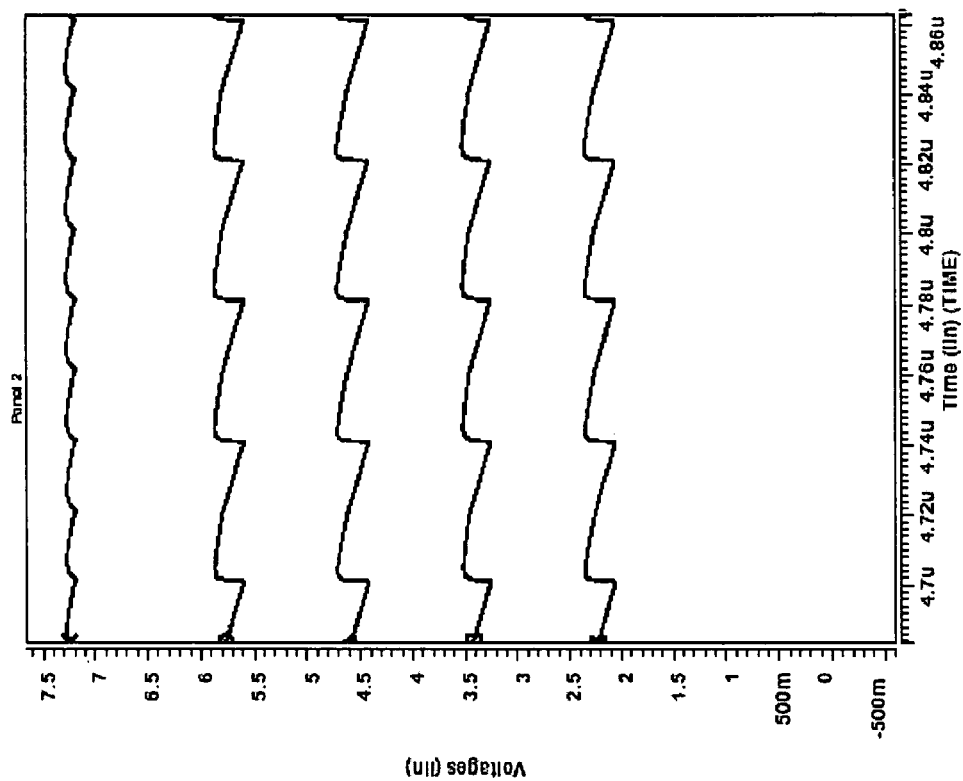
FIG. 6 is a comparison curve of the output voltage under different time of the present invention and the prior art.

Please refer to FIG. 6, which is a diagram of the outputting waveforms of the charge pump circuits under the fixed outputting current load 20 μA. From high to low, the curves means the claimed charge pump circuit with 1 p driving capacitor, the J.-T charge pump with 1.6 p driving capacitor, the J.-T charge pump with 1 p driving capacitor, the Dickson charge pump with 2 p driving capacitor, and the Dickson charge pump with 1 p driving capacitor. Thus it can be seen the curve of the charge pump circuit of the present invention is more stable than that of two prior charge pump circuits.

In the low-voltage process, the reliability issue of the gate oxide layer is very important. When a charge pump circuit is manufactured with a low-voltage process, the consideration of both reliability and performance will make the design complex and difficult. In contrast to the prior art, the present invention discloses a novel charge pump circuit to solve the disadvantages. The present invention can be safely operated in the low-voltage process without danger of avalanche, and can provide a higher and more stable outputting voltage. Hence, the present invention can not only be used in the low-voltage process but also have advantage of high pumping gain. This circuit doesn't have the problem of exceeding voltage of the gate oxide layer and is suitable for providing the high voltage in the low-voltage devices. In addition, this circuit can overcome the overload problem on the gate oxide layer and improve the reliability of the gate oxide layer.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A charge pump circuit suitable for a low-voltage process, the charge pump circuit being connected by an input thereof to an integrated circuit voltage source to produce at a voltage-output terminal of the charge pump circuit a voltage $V_{OUT}$ higher than a voltage $V_{DD}$ of the integrated circuit voltage source, the charge pump circuit comprising a timing signal generator outputting a pair of complementary timing signals, and a plurality of voltage amplifying circuits formed in n stages, each stage having a first timing input coupled to one of said pair of complementary timing signals and a second timing input coupled to the other of said pair of complementary timing signals, each first timing input of said n stages being alternately coupled to a different one of said pair of complementary timing signals and each second timing input of said n stages being alternately coupled to a different one of said pair of complementary timing signals, each stage of said n stages of the voltage amplifying circuits comprising:

a first CMOS device and a second CMOS device coupled to said first CMOS device, said first CMOS device including a first NMOS transistor with a drain coupled to a first node and a first PMOS transistor with a drain coupled to said first node, said second CMOS device including a second NMOS transistor with a drain coupled to a second node and a second PMOS transistor with a drain coupled to said second node, each of said first NMOS and first PMOS transistors respectively having a gate electrode coupled to said second node and each of said second NMOS and second PMOS transistors respectively having a gate electrode coupled to said first node, said first NMOS transistor having a source defining a first input and said second NMOS transistor having a source defining a second input, said first PMOS transistor having a source defining a first output and said second PMOS transistor having a source defining a second output;

a first capacitor and a second capacitor, said first capacitor having a first terminal defining said first timing input and a second terminal coupled to said first node, said second capacitor having a first terminal defining said second timing input and a second terminal coupled to said second node; and two diode devices, each of said two diode devices having anodes connected to a respective one of said first and second nodes for guiding electrical charges accumulating on corresponding gate electrodes to a succeeding stage;

wherein said first and second inputs of a first stage are mutually coupled to the $V_{DD}$ integrated circuit voltage source and said first and second outputs of each of said first through n−1 stages are connected to a corresponding one of said first and second inputs of a succeeding stage, said first and second outputs of said nth stage being mutually coupled to an output of said charge pump circuit.

2. The charge pump circuit of claim 1, wherein said each diode device limits said charges accumulating on said gate electrode of the respective CMOS transistor to flow in one direction.

3. A charge pump circuit suitable for a low-voltage process, the charge pump circuit being connected by an input thereof to an integrated circuit voltage source to produce at a voltage-output terminal of the charge pump circuit a voltage $V_{OUT}$ higher than a voltage $V_{DD}$ of the integrated circuit voltage source, the charge pump circuit comprising:

a timing signal generator outputting a first phase and second phase a pair of complementary timing signals;
   a plurality of stages of voltage amplifying circuits connected each to the other, each voltage amplifying circuit of said plurality of stages including a first CMOS device and a second CMOS device coupled to said first CMOS device, a plurality of first capacitors and a plurality of second capacitors, each said first capacitor having a first terminal defining a first timing input and a second terminal coupled to said first CMOS device of a respective voltage amplifying circuit to perform a switching operation in accordance with a respective one of said complementary timing signals input to said first terminal, each said second capacitor having a first terminal defining a second timing input and a second terminal coupled to said second CMOS device of said respective voltage amplifying circuit to perform a switching operation in accordance with the other of said complementary timing signals input to said first terminal of said second capacitor; and a plurality of diode devices, each of said plurality of diode devices being connected to said second terminal of a respective one of said first and second capacitors of each voltage amplifying circuit for guiding accumulated electrical to a succeeding stage;

wherein each first timing input of said plurality of stages of voltage amplifying circuits is alternately coupled to the first phase and the second phase of said pair of complementary timing signals and each second timing input of said plurality of stages of voltage amplifying circuits is alternately coupled to the second phase and the first phase of said pair of complementary timing signals.

4. The charge pump circuit of claim 3, wherein each first CMOS device is composed of a NMOS transistor and a PMOS transistor.

5. The charge pump circuit of claim 3, wherein each second CMOS device is composed of a NMOS transistor and a PMOS transistor.

6. The charge pump circuit of claim 4, wherein a source electrode of the NMOS transistor of each first CMOS device is connected to a first voltage input terminal, a source electrode of the PMOS transistor is connected to a first voltage input terminal of a next stage, and respective drain electrodes of the NMOS transistor and the PMOS transistor are connected to said second terminal of a respective one of said first and second capacitors.

7. The charge pump circuit of claim 5, wherein a source electrode of the NMOS transistor of each second CMOS device is connected to a second voltage input terminal, a source electrode of the PMOS transistor is connected to a second voltage terminal of a next stage, and respective drain electrodes of the NMOS transistor and the PMOS transistor are connected to said second terminal of a respective one of said first and second capacitors.

* * * * *